Oct. 23, 1962 W. S. PRAEG 3,059,385
METHOD OF HONING GEARS
Filed March 23, 1959
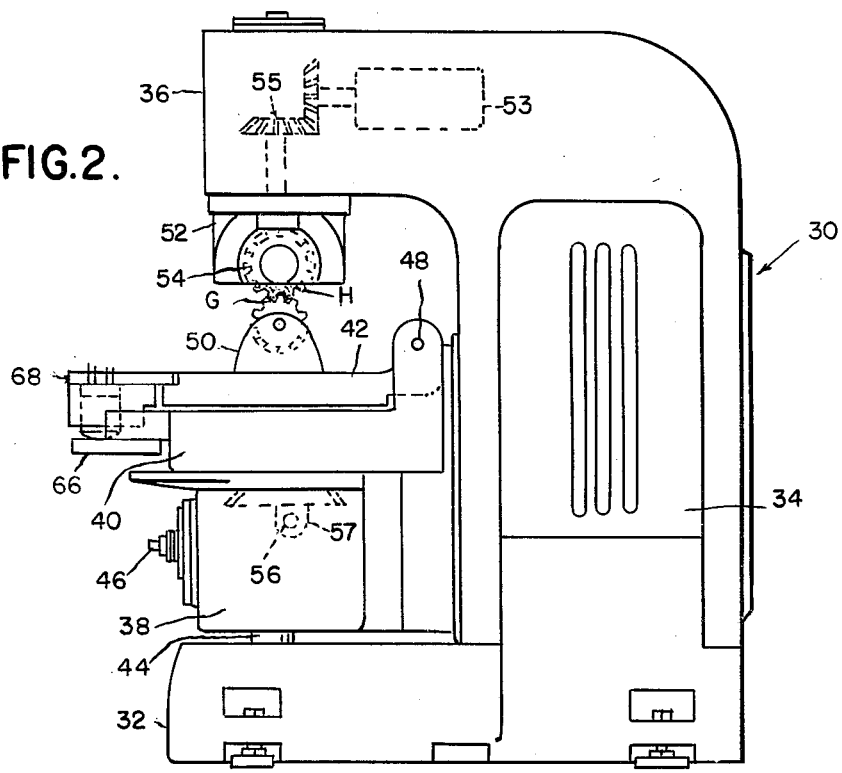
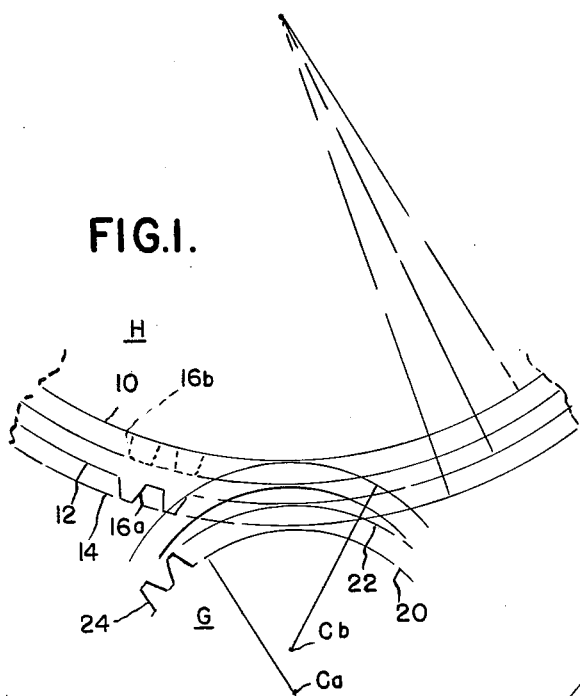
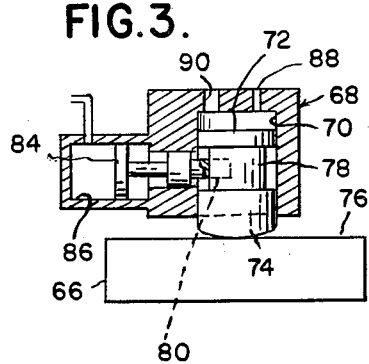
INVENTOR.
WALTER S. PRAEG
BY Whittemore
Hulbert & Belknap
ATTORNEYS United States Patent Office 3,059,385
Patented Oct. 23, 1962

3,059,385
METHOD OF HONING GEARS
Walter S. Praeg, Detroit, Mich., assignor to National Broach & Machine Company, Detroit, Mich., a corporation of Michigan
Filed Mar. 23, 1959, Ser. No. 801,094
3 Claims. (Cl. 51—287)

The present invention relates to a method of honing gears.

It is an object of the present invention to provide a method of using a gear honing tool in the form of a gear conjugate to the form desired on a series of work gears, the toothed portion of the hone being formed of a solid resin compound in which the resin constituent is preferably epoxy resin and containing a multiplicity of separated abrasive particles distributed therethrough, the depth and width of the spaces between the teeth of the hone being related to the dimensions of the teeth of the gears being honed such that the crests of the teeth of the gears being honed engage the bottoms of the tooth spaces in the hone whereby the teeth of the gears produce a continuous regeneration of the entire tooth spaces of the hone including the flanks of adjacent teeth and the bottoms of the tooth spaces thereof.

It is a further object of the present invention to provide a method comprising the steps of placing a tool of the character described in the preceding paragraph in mesh sequentially with a series of work gears, maintaining the tool and gears under radial pressure acting along the line intersecting the axes of both said tool and gears, rotating either the gear or tool directly and the other through the intermeshing engagement between the parts.

It is a further object of the present invention to provide a method as described in the preceding paragraph in which the pressure between the tool and gears is maintained at a substantially constant value throughout the honing operation.

It is a further object of the present invention to provide a method as described in the second paragraph above in which the pressure between the gears and tool is produced by meshing the tool and gears tightly under a predetermined pressure, and thereafter maintaining constant center distance between the gear and tool during the ensuing honing operation.

It is a further object of the present invention to provide a method of honing gears as described in the foregoing paragraphs in which the gear and hone are operated in mesh at crossed axes, and in which a relative traverse between the gear and hone is provided in a plane parallel to the axes of both the hone and gears and preferably in a direction parallel to the axes of the gears.

Other objects and features of the invention will become apparent as the description proceeds, especially when taken in conjunction with the accompanying drawings, illustrating a preferred embodiment of the invention, wherein:

FIGURE 1 is a diagrammatic view illustrating the relationship between a hone and a series of work gears throughout the life of the hone.

FIGURE 2 is a side elevation of a machine suitable for use in practicing the method disclosed herein.

FIGURE 3 is an enlarged view partly in section showing the pressure applying and locking means associated with the gear honing machine.

The operation referred to herein as gear honing basically involves running a work gear in mesh with a gearlike honing tool. The operation may be carried out as a final finishing operation on a hardened steel gear and may be employed to remove nicks and minor imperfections from the teeth of the work gear, or in some cases it may be used to improve surface finish as well as profile and tooth form.

The honing tool employed for this operation is a gearlike body having peripheral teeth conjugate to the form desired on a series of work gears to be finished. At least the peripheral toothed portion of the honing tool is formed of a resin compound in which the resin constituent is preferably epoxy resin. A suitable tool for this purpose may be made by casting a resin compound into final form and curing the same by the application of heat.

By way of a specific example, a resin compound containing equal parts of an epoxy resin and a suitable filler such for example as powdered silica, may have a hardener or accelerator added thereto, a suitable hardener or accelerator being an aliphatic polyamine such as diethylene triamine, in which case about one part of the hardener to twelve parts of the epoxy resin is suitable. An epoxy resin suitable for this purpose is produced by reacting epichlorohydrin and bisphenol A in the presence of a sodium hydroxide solution in water. The reaction is carried out at a temperature of about 100 degrees centigrade. After the condensation reaction has taken place, the resin is freed of residual epichlorohydrin and is washed well to remove salt and soluble by-products. The reaction is carried out to produce a reaction product having an average molecular weight of approximately 400. The resin is a liquid. The epoxy value, equiv./100 gm. is 0.50. The hydroxyl groups per molecule are 0.14–0.28.

The honing tool as described above has a specially long life and in some cases is capable of finishing a great many thousands of gears even though the gears may in some cases have substantial nicks and burrs on their teeth. However, despite its long life, the honing tool is subjected to continuous wear or breakdown throughout its life. It has been found that by controlling the rate and manner of breakdown of the hone, the teeth of the hone may be preserved throughout the useful life of the hone in a condition to perform an efficient honing operation and at the same time to produce substantial improvement in the teeth of the gears being honed, particularly in the involute profile thereof. Moreover, by controlling the breakdown of the teeth of the hone, glazing of the teeth is prevented and breakage of the teeth due to excessive pressure developed as a result of glazing is completely eliminated.

It has been found that best results are obtained when the honing operation is carried out by rolling the hone in mesh with the work gears with the parts urged into pressure engagement by forces applied radially thereto in the direction of a line passing through the axes of the hone and work gears. This pressure may be applied continuously and substantially uniformly throughout the honing operation, or as an alternative, the hone may be urged into pressure contact with the gears at a predetermined pressure and the parts locked at the center distance determined by the radial force. Thereafter, the hone and gears are rolled by driving either the gear or hone in rotation and the other of the two members through the meshed engagement therebetween. Preferably, the operation is carried out with the axes of the gear and hone crossed and a relative traverse provided between the gears and hone in a plane parallel to the axes of both the gears and hone and preferably in a direction parallel to the axes of the gears.

It will be apparent that a tooth of the gear or hone urged by radial force into a tooth space of the other member at a given force develops forces of much greater magnitude between the flanks of the teeth due to the wedging action therebetween. The magnitude of these developed forces is dependent on a number of factors including operating pressure angle. Inasmuch as the teeth of the gear and hone are initially brought into tight mesh or are maintained through the honing operation in tight mesh, it will be apparent that in conventional honing relative approach between the gear and hone is prevented only by the wedging action between the flanks of the teeth. As the gear and hone are rotated this wedging action is variable and produces unpredictable and uncontrolled conditions which vary as a tooth moves through the zone of meshed engagement. This has led to a change in form of the hone teeth, the development of a shoulder adjacent the roots of the hone teeth, and other undesirable results.

It has now been found that if the hone is designed so that the crests of the gear teeth engage the bottoms of the tooth spaces of the hone, several important advantages are obtained. In the first place, the engagement between the crests of the teeth of the gear and the surfaces at the bottoms of the tooth spaces of the hone is the engagement which is effective for the most part to limit radial movement between the gear and hone; or in other words, to control the depthwise movement between the gear and hone. This relieves the flanks of the teeth from the cramping pressure which has in the past led to distortion of tooth profile of the hone and other undesirable results. Secondly, the engagement between the crests of the teeth of the work gears with the surfaces at the bottoms of the tooth spaces of the hone provides for a controlled breakdown of the material of the hone and this in turn leads to a controlled continuous regeneration of the honing surface. This regeneration, again due to the engagement between the crests of the teeth of the work gear and the surfaces at the bottoms of the tooth spaces of the hone, takes place over the entire tooth space of the hone including the tooth flanks at opposite sides thereof and the root surfaces at the bottoms of the tooth spaces. This continuous regeneration of the honing surface keeps the surfaces sharp and effective and prevents glazing. It also has the effect of maintaining desirable profiles on the honing surfaces so that they are effective to produce the required tooth form on the teeth of work gears.

Finally, the engagement of the crests of the teeth of the work gears with the surfaces at the bottoms of the tooth spaces of the hone has the further desirable effect of finishing the crests and corners at the tops of the gear teeth, thus removing burrs or imperfections which would be missed if the engagement between the teeth were limited to engagement between the flanks thereof.

It has been found that by designing a honing tool for initial operation with tooth flanks containing portions of the involute spaced substantially upwardly from the base circle, the regeneration may be continued for an extended period. In one specific case a hone designed for operation on a gear having 16 diametral pitch was continuously used until the root diameter was reduced by approximately four times the initial depth of the tooth spaces on the hone. In general, it appears that regeneration may be continued to a point where the base diameter approaches the operating pitch diameter.

Referring now to FIGURE 1, the foregoing is diagrammatically illustrated. In this figure the base diameter of the honing tool H is indicated at 10, its initial root diameter is indicated at 12, and its initial outside diameter is indicated at 14. Some of the teeth initially provided on the hone are indicated at 16a. This hone is designed for use with a pinion or work gear G, the root diameter of which is indicated at 20 and the outside diameter at 22. A few of the teeth of the gear G are designated 24. When the hone is new the work gear G is meshed therewith with its center in the position designated Ca. It will be observed that the outside diameter of the work gear is shown as tangent to the root diameter of the hone, a condition which brings about engagement between the crests of the gear teeth 24 with the surfaces at the bottom of the tooth spaces of the hone H.

As the series of gears G is honed by the hone H the teeth of the hone are continually regenerated depth-wise, accompanied by a breakdown of the bottom of the spaces between the teeth of the hone H. As the teeth of the hone are regenerated the work gear is of course brought to closer and closer center distance, its center moving toward and possibly beyond the position indicated at Cb. Ultimately, the teeth of the hone are regenerated to occupy the position shown at 16b. The teeth are shown as having a root diameter coincident with the base diameter of the hone 10. Actually, this is not the extreme limiting condition since the teeth may be generated further to a point such that the base diameter 10 approaches the operating pitch diameter of the teeth.

A factor which controls successful regeneration of the teeth of the hone during the finishing of a series of work gears is the pressure condition existing during the honing operation between the teeth of the hone and work gears. The actual pressure or force is influenced by a number of factors such as pitch, pressure angle, the thickness of the crest portion of the work gears, the width of the gears, etc. While the actual force developed between the gear and hone radially thereof and acting generally in the direction of a line intersecting the axes of the hone and gears is influenced by these various conditions, in general it appears that best results are obtained when this force is substantial as for example, in excess of twenty pounds, and preferably between twenty and one hundred and twenty-five pounds. Excellent results on a 16 pitch pinion have been obtained using a total force of sixty pounds. Equally good results have been obtained on a 9½ pitch pinion using a total force of eighty pounds. Forces of this general magnitude are sufficient to insure continuous regeneration of the honing surface thereby eliminating any tendency of any portion of the honing surface to glaze. Moreover, since these pressures are for the most part supported by engagement between the surfaces at the crests of the teeth of the gear and the surfaces at the bottoms of spaces between the teeth of the hone, excessive cramping pressure between the flanks of the teeth of the gears and hone is eliminated.

Reference is made herein to pressures or forces urging the gear and hone toward each other. It will be understood that there is no intention of attempting to describe a unit pressure between the areas in contact since it is as least impractical to attempt to compute unit pressure. On the other hand, the pressure or force which is referred to is the force actually effective directly between the gear and honing tool as will be emphasized in the subsequent description of an apparatus suitable for carrying out the operation.

Referring now to FIGURES 2 and 3 there is shown a machine capable of operation in a manner to carry out the invention disclosed herein. Described in general terms, the machine comprises a frame indicated generally at 30 including a base 32, a column 34, an overhanging portion 36, a vertically movable knee 38, a carriage 40 mounted on the knee, and a pivoted support table 42. The knee 38 is vertically movable to accommodate gears of different sizes and to provide a preliminary setting of the machine. Suitable means such for example as a feed screw 44 may be provided for effecting vertical adjustment of the knee, this being accomplished by rotation of the feed screw 44 and a nut (not shown) as controlled by a handle applied to the square end of an actuating shaft 46. The carriage 40 is mounted on suitable ways provided at the top of the knee 38 and may be mounted thereon for reciprocation in a horizontal plane in a direction perpendicular to the plane of FIGURE 2. In other cases, as is well understood in the art, the direction of traverse in the horizontal plane may be varied.

Mounted on the carriage 40 is the pivoted table 42, the table being mounted for rocking movement about pivot means indicated at 48 which extend horizontally and which are located above the plane of the table so as to be somewhat closer to the horizontal plane passing through the point of contact between the gear G and tool H. Mounted on the pivoted table 42 is a rotary work support means including a headstock (not shown) and a tailstock indicated at 50. In the gear honing operation the gear G is in mesh with a honing tool H. While the axes of the gear G and honing tool H in FIGURE 2 are indicated as parallel, in practice the axes of these members will be crossed in space normally at an angle of between three and thirty degrees. The tool H is carried by an angularly adjustable head 52, the head being mounted for adjustment about a vertical axis to vary the crossed axes setting between the gear and tool. A motor 53 is provided and is connected to the spindle 54 of the tool H by gearing indicated at 55. Normally, suitable feed means such as the feed screw 56 and nut 57 are provided for effecting relative traverse between the carriage 40 and the knee 38.

The pivoted table 42 is mounted for substantially free angular movement about the axis of its pivot support 48 and limited angular movement from the position illustrated produces substantially vertical movement of the gear G. When the gear G is in firm mesh with the tool H upward torque applied to the table 42 results in radial pressure or force acting between the gear and tool along a line connecting their axes.

Referring now more particularly to FIGURE 3, means are provided for moving the pivoted table 42 upwardly in a controlled manner. The carriage 40 has rigidly secured thereto a support plate 66. Fixedly secured to the pivoted table 42 is an expansible fluid pressure operating means indicated generally at 68 which comprises a cylinder 70 open at its bottom and having a piston 72 vertically movable therein. The lower end of the piston includes a spherically rounded portion 74 engageable with the upper surface 76 of the plate 66. The intermediate portion of the piston 72 is reduced as indicated at 78 and is engaged by a friction lock 80 carried by a plunger 82 connected to a piston 84 movable horizontally in a cylinder 86.

Fluid, preferably hydraulic fluid, may be admitted under controlled pressure through the ports 88 and 90 to the cylinder 70 to apply a force on the piston 72 tending to elevate the table 42 so as to urge the gear G into mesh with a predetermined force with the hone H. The pressure of the fluid required to exert the desired force may be determined by experimentation but of course is sufficient in the first place to overcome the weight of the table 42 and then to provide a sufficient excess force balanced by the pressure contact between the gear and hone.

The honing operation may be carried out while pressure is admitted to the cylinder 70 so that the predetermined radial force between the gear and hone is maintained substantially constant throughout the honing operation. Alternatively, pressure may be applied initially to bring the gear and hone into pressure contact at the predetermined pressure, after which hydraulic fluid may be admitted to the cylinder 86 to actuate the friction lock and thus preserve the center distance between the gear and hone at the value determined by the pressure initially applied. In this latter case as material is removed from the teeth of the gear by honing there will be some reduction in pressure during the honing operation.

The regeneration of the honing surfaces of the honing tool is facilitated by the fact that ordinarily the outside diameter of a gear blank which has been machined to produce a gear is normally turned so that the crests of the teeth of the work are normally rough-turned surfaces most effective to facilitate breakdown of the material of the hone at the bottoms of the tooth spaces in a controlled manner.

Since the regeneration of the hone may in some cases progress to a point where the regenerated teeth are located at a substantially smaller root diameter than when the hone is new, it is necessary to periodically reduce the outside diameter of the hone, to avoid contact between the tops or crests of the hone teeth and the bottoms of the tooth spaces in the work gears.

The honing operation is carried out with the hone and work gear rotated at substantial speeds, as for example approximately 850 feet per minute pitch line velocity. While this is a substantial velocity it will of course be understood that the actual relative motion between contacting surface portions of the teeth of the gear and hone is very substantially less than this amount. In face, theoretically, at the pitch line the relative sliding velocity between engaged surface portions of the teeth of the gear and hone is only that attributable to divergent paths of direction due to the crossed axes setting. Accordingly, the engagement between the surface portions of the teeth of the gears and hone is in no sense equivalent or similar to the type of contact existing between engaged surface portions of a grinder and a work piece.

Evidence is available which indicates that the regenerating action on the engaged surface portions of the hone is quite similar to crush trimming as carried out by rolling a grinding wheel slowly in pressure contact with a shaped crushing roll. It may be supposed that the action in regenerating the flanks of the teeth is primarily controlled by the engagement between the crests of the teeth of the work gears with the surfaces at the bottoms of the spaces of the hone. Moreover, the breakdown or regeneration of the material of the hone at the bottoms of the tooth spaces thereof is of course relatively slow since the operation is essentially that of forcing the crests of the teeth of the work gears into the solid material of the hone. In other words, at this point the substantial forces developed have no tendency to effect breakage of the hone teeth or damage to the flank surfaces thereof, as contrasted to uncontrolled and variable forces developed by wedging.

The foregoing description is based upon experience obtained in honing ordinary gears which in general may be considered as gears having a face width of at least 3/8 of an inch and of other than "fine pitch" type. The American Gear Manufacturers Association identifies "fine pitch" gears as those having a diametral pitch less than twenty.

It is of course recognized that general instructions contained in the foregoing may require modification if exceptional or unusual gears are to be honed, or if the operating conditions are drastically changed. It may be mentioned for example, that the required pressure to bring about continuous breakdown and regeneration of the teeth of the hone will vary with the crossed axes setting between the gear and tool. This of course is because the area of contact between the teeth of a gear and tool varies with the crossed axes setting. If the axes of the gear and tool are parallel (zero crossed axes) the theoretical contact between the surfaces occupies a line extending from end to end of the teeth, unless exceptionally high helix angle is present. In practice, this theoretical line of contact of course becomes a substantially elongated area. When the axes are crossed at any angle the theoretical contact between the tooth surfaces becomes a point. However, when the crossed axes angle is exceedingly small, the actual contact approaches the elongated area contact present in parallel axes meshing. At relatively high crossed axes the divergence of the surfaces is such as to cause the actual area of contact to be of reduced area and to become more nearly a circular area. When the operation is carried out as taught herein by causing the teeth of the hone to bottom in the tooth spaces of the gear, variations in pressure between the flanks or sides of the teeth of the gear and hone due to variations in crossed axes setting is less pronounced. However, at parallel axes or at relatively small axes (as for example two or three degrees), somewhat higher than usual forces acting to urge the hone and gear toward each other are required.

It may also be mentioned that as a practical matter, it is ordinarily necessary to design the hone such that when in new condition, the crests of the teeth of the hone do not initially bottom in the bottoms of the tooth spaces of the gear. Thus, when the hone is first brought into operation with a succession of gears there will be a few gears honed before the hone wears to the point where the crests of its teeth bottom in the tooth spaces of the gear. During this initial break-in period it is sometimes desirable to operate with a smaller force urging the gear and hone together, because this force is opposed only by the wedging action between the flanks of the teeth of the gear and hone, until the hone breaks down to a point such that the crests of its teeth bottom in the tooth spaces of the gear.

It will of course be understood that when a gear-like hone and work gear are in mesh under continuing radial pressure, the considerations which determine whether or not the crests of the teeth of the work gear will engage the bottoms of the tooth spaces of the hone are the heights of the hone and gear teeth and the thickness of the teeth and tooth spaces of the gear and hone. In general, the desired relationship may be defined as that resulting from the use of tools having tooth spaces whose depth and width are related to the tooth height and to the thickness of the work gears so as to cause the aforesaid engagement.

The drawings and the foregoing specification constitute a description of the improved gear honing tool and the method of using the same in such full, clear, concise and exact terms as to enable any person skilled in the art to practice the invention, the scope of which is indicated by the appended claims.

What I claim as my invention is:

1. The method of honing a series of like work gear members to a desired form which comprises meshing the work gear members at crossed axes serially with a gear honing tool member comprising a gearlike body conjugate to the desired form to which the work gear members are to be finished, the toothed portions of said tool member having tooth spaces whose depth and width are related to the tooth height and tooth thickness of the work gear members such that both of the flanks of the teeth of the gear member and tool member are in pressure engagement resulting from tight mesh and such that the crests of the teeth of the work gear members engage the bottoms of the tooth spaces of said tool member, at least the toothed periphery of the honing tool member being formed of a resin compound containing abrasive particles and subject to continuous breakdown under pressure with the work gear members in use, maintaining the tool and gear members under substantially uniform continuous pressure acting radially therebetween substantially along a line intersecting the axes of both said tool and gear members, thereby continually removing material from both flanks of all of the teeth of the tool member and from the bottoms of the tooth spaces of the tool member to permit a continual reduction in center distance between the tool member and the succession of gear members honed thereby as the material of the tool member is worn away both from the flanks thereof and from the bottoms of the spaces between its teeth, driving one of said tool and gear members and the other of said tool and gear members being driven through the meshed relation between said tool and gear members, and relatively traversing said tool and gear members in a plane parallel to the axes of both of said tool and gear members.

2. The method of honing a series of like work gear members to a desired form which comprises meshing the work gear members at crossed axes serially with a gear honing tool member comprising a gear-like body conjugate to the desired form to which the work gear members are to be finished, the toothed portions of said tool member having tooth spaces whose depth and width are related to the tooth height and tooth thickness of the work gear members such that both of the flanks of the teeth of the gear member and tool member are in pressure engagement resulting from tight mesh and such that the crests of the teeth of the work gear members engage the bottoms of the tooth spaces of said tool member, at least the toothed periphery of the honing tool member being formed of a resin compound containing abrasive particles and subject to continuous breakdown under pressure with the work gear members in use, maintaining the tool and gear members under substantially uniform continuous pressure acting radially therebetween substantially along a line intersecting the axes of both said tool and gear members, thereby continually removing material from both flanks of all of the teeth of the tool member and from the bottoms of the tooth spaces of the tool member to permit a continual reduction in center distance between the tool member and the succession of gear members honed thereby as the material of the tool member is worn away both from the flanks thereof and from the bottoms of the spaces between its teeth, driving one of said tool and gear members and the other of said tool and gear members being driven through the meshed relation between said tool and gear members, and relatively traversing said tool and gear members in a direction parallel to the axes of said work gear members.

3. The method as defined in claim 2 in which the total pressure between the honing tool member and the gear members acting radially therebetween is between 20 and 125 pounds.

References Cited in the file of this patent

UNITED STATES PATENTS

| 1,749,670 | Hoke | Mar. 4, 1930 |
| 1,960,841 | Fellows | May 29, 1934 |
| 1,989,650 | Drummond | Jan. 29, 1935 |
| 1,989,651 | Drummond | Jan. 29, 1935 |
| 2,351,842 | Seibold | June 20, 1944 |
| 2,913,858 | Praeg et al. | Nov. 24, 1959 |